United States Patent [19]
Isenberg et al.

US005575865A

[11] Patent Number: 5,575,865

[45] Date of Patent: Nov. 19, 1996

[54] PROCESS FOR COATING A WORKPIECE OF STEEL WITH AN ANTI-CORROSIVE AGENT

[75] Inventors: Rainer Isenberg, Iserlohn Letmathe; Wolfgang Hoffmann, Iserlohn; Rudolf Reinecke, Nottebohmstrasse 4, 5880 Ludenscheid; Hans W. Herr, Werdohl, all of Germany

[73] Assignees: ITW Befestigungssysteme GmbH, Letmathe; Eibach Oberflachentechnik GmbH, Finnentrop; Rudolf Reinecke, Ludenscheid, all of Germany

[21] Appl. No.: 409,918

[22] Filed: Mar. 24, 1995

Related U.S. Application Data

[63] Continuation of Ser. No. 865,162, Apr. 8, 1992, abandoned.

[30] Foreign Application Priority Data

Apr. 10, 1991 [DE] Germany .......................... 41 11 701.8

[51] Int. Cl.$^6$ .................................................. C23C 22/24
[52] U.S. Cl. ........................................... 148/265; 427/406
[58] Field of Search ..................................... 427/406, 409, 427/408; 148/265; 428/623

[56] References Cited

U.S. PATENT DOCUMENTS

| | | | |
|---|---|---|---|
| 2,703,768 | 5/1955 | Hall | 148/261 |
| 3,717,509 | 2/1973 | Palm | 148/265 |
| 3,819,425 | 6/1974 | Ridder | 148/265 |
| 4,098,620 | 7/1978 | Sato | 148/265 |
| 4,537,837 | 8/1985 | Gunn | 205/196 |
| 4,555,445 | 11/1985 | Frey | 148/265 |
| 4,606,800 | 8/1986 | Hart | 427/409 |
| 4,695,516 | 9/1987 | Kenichi | 148/265 |
| 4,746,408 | 5/1988 | Hyner | 427/408 |
| 4,830,889 | 5/1989 | Henry | 427/238 |
| 5,178,903 | 1/1993 | Lat | 427/406 |
| 5,330,850 | 7/1994 | Suzuki | 428/623 |

*Primary Examiner*—Sam Silverberg
*Attorney, Agent, or Firm*—Schwartz & Weinrieb

[57] ABSTRACT

A process for coating a workpiece of steel with an anti-corrosive agent, comprising the steps of providing the surface of the workpiece with a chemo-mechanical layer, and chromatizing the chemo-mechanical layer, and characterized by the steps of providing the chromated layer with a further layer containing metallic components and organic binding agents, and curing the further layer by a heat treatment.

28 Claims, No Drawings

PROCESS FOR COATING A WORKPIECE OF STEEL WITH AN ANTI-CORROSIVE AGENT

This application is a continuation of application Ser. No. 07/865,162, filed Apr. 8, 1992, now abandoned.

FIELD OF THE INVENTION

The invention relates to a process for coating a workpiece of steel with an anti-corrosive agent which also avoids a hydrogen embrittlement of workpieces of steel, wherein the process comprises the steps of first providing the surface of the workpiece with a chemo-mechanical layer and then chromatizing the chemo-mechanical layer. This process is suitable for all types of workpieces, particularly for workpieces treated with hardening techniques and for non-treated workpieces.

BACKGROUND OF THE INVENTION

In a known process of the above mentioned type, the step of applying the chemo-mechanical layer preferably includes the steps of degreasing and cleaning the surface of the workpiece, coating the cleaned surface with copper, providing the copper layer with a promotor, and a galvanizing step. Zinc can be replaced by other metals, such as tin, aluminum or cadmium. Such chemo-mechanical plating processes are known from the publication "Mechanical Plating—Die Entwicklung des Verfahrens", U. Meyer in "Galvanotechnik", Eugen G. Lenze Verlag, Vol. 73 (1982), No. 9. The final chromatizing step may be performed, particularly electrolytically, in a conventional manner. There is a need to improve the protection of the workpieces against the so-called "under-corrosion" of such workpieces coated with an anti-corrosive agent in order to effect an improvement in the anti-corrosive properties thereof.

OBJECT OF THE INVENTION

The object of the invention is to provide a process of the above mentioned type which particularly increases the resistance against corrosion of the treated workpieces and which avoids hydrogen embrittlement.

DETAILED DESCRIPTION OF THE INVENTION EMBODIMENTS

A first process according to the invention comprises first providing the chromated layer with a further layer containing metallic components and organic binding agents and then curing the further layer by a heat treatment. The applied further layer can include so-called sacrificial metals, such as zinc and optionally aluminum as metallic components, a resin as the organic binding agent, and a solvent. The heat treatment causes a volatilization of the solvent and a cross-linking of the resin components whereby the further layer is fixed on the chromated layer so that an inorganic top layer substantially containing metallic components is achieved. According to the invention, a workpiece coated with an anti-corrosive agent reveals significantly improved anti-corrosion properties with respect to a conventionally coated workpiece as measured by salt spray exposure or the Kesternich test. The inventive process can be simply carried out and is inexpensive in the mass production of workpieces.

According to an alternative process of the invention, the chromated layer is provided with an organic top layer. In combination with the first process according to the invention, the organic top layer can also cover the cured further layer.

Prior to coating, the organic top layer contains a solvent and an organic binding agent, particularly a resin which is fixed on the workpiece after volatizing the solvent. The workpiece coated with the organic top layer which can be simply applied also reveals an improved resistance to corrosion, although the coating according to the first inventive process provides significantly better results, especially with the test methods mentioned above. The tendency of the workpiece to corrode as a result of contact with another metallic workpiece is reduced due to the low electrical conductibility of the organic top layer. Therefore, the advantageous combination of the organic top layer with the cured further layer is preferred as in this case the anti-corrosion properties are further improved.

According to a preferred embodiment of the invention, the organic top layer and/or the chemo-mechanical layer contains a lubricant, preferably PTFE particles. The sliding effect of the surface of the workpiece can be adjusted over a large scale by varying the amount of the lubricant used. This sliding effect is especially useful in connection with the combination of the top layer with the further layer as the well developed sliding effect of the further layer is only adjustable to a low degree. A lubricant included in the chemo-mechanical layer may provide emergency lubrication properties to the workpiece if the outer layers are damaged. This property can be especially important for highly stressed surfaces of workpieces. Supplements to the lubricant are advisable for coatings of fasteners having threads.

A chrome yellow is preferably used for the chromatizing step providing a suitable adhesive basis for an applied layer, particularly in combination with organic binding agents.

A strong adhesion is applied as an achieved if the chromated layer is extremely thin layer which is also resistant against wiping. In this case, the layer has an iridescent outlook, with the chrome yellow causing a slight yellow colour. Damage to of the chromated layer upon the further treatment of the workpiece can be avoided through the application of the chromated layer in a manner which is resistant to wiping. This can be achieved by using a chromate compound dissolved in an aqueous suspension. Using an electrolytically chromatizing method, a brownish chromate layer is normally generated which does not possess the desired quality.

According to a further embodiment of the invention, the chromated layer is provided with an adhering agent which is based on water-soluble organic resins, prior to the application of the further layer.

The chemo-mechanical layer having a porous surface may also have an effect for the adhesion of the layer applied to the chromated layer.

According to a preferred embodiment of the invention, the further layer contains zinc, preferably about 85%, and aluminum, preferably 2 to 3%, or similar metals. The further layer can also contain a solvent, preferably about 10 to 15%, and a binding agent. These percentages relate to the state of the further layer before the heat treatment is carried out. Hence, a highly reactive zinc-containing system is used to define after the heat treatment, the further layer as a diffusion-resistant film having cathodic protection properties, due to the metal components and the binding agent. The zinc components having a thin plate structure are superimposed as tiles whereby the further layer is very homogeneously constructed.

According to a preferred embodiment of the invention, the further layer is cured for about 15 to 20 minutes at a temperature of about 200° C. According to a further embodiment of the invention, the organic top layer contains an organic binding agent, a solvent, preferably about 45 to 50%, and optionally pigments.

The process can be applied to means of construction, such as fasteners or the like.

According to a preferred coating of an anti-corrosive agent, the workpiece includes a chemo-mechanical layer of zinc having a copper layer, and then coated thereon a thin, wipe resistant, chromated layer applied as an aqueous suspension and then dried. The chromated layer is provided with an adhering agent based on water-soluble organic resins, wherein the adhering agent in turn is covered by a cured further layer which prior to curing substantially consists of about 85% zinc, 2 to 3% aluminum, 5% binding agent and a solvent. A respective composition is commercially available under the term "Deltatone" (company D örken). The further layer is cured for about 15 to 20 minutes at a temperature of about 200° C. The further layer can also consist of a plurality of individual layers overlying each other. An organic top layer consisting of a mixture of 45 to 50% lubricant and organic binding agent, optionally containing a PTFE lubricant, may be applied to the further layer. A respective composition is commercially available under the term "Deltaseal" (company Dörken).

Obviously, many modifications and variations of the present invention are possible in light of the above teachings. It is therefore to be understood that within the scope of the appended claims, the present invention may be practiced otherwise than as specifically described herein.

We claim:

1. A process for coating a workpiece of steel with an anti-corrosive agent, comprising the steps of:

providing the surface of said workpiece with a chemo-mechanical layer which includes a galvanized component selected from the group of zinc, tin, aluminum, and cadmium;

chromatizing said chemo-mechanical layer;

providing said chromated layer with a further layer containing predominantly metallic components, resinous organic binding agents, and a solvent;

curing said further layer by means of a heat treatment comprising heating of said further layer upon said coated workpiece to a temperature level of approximately 200° C. for approximately 15–20 minutes so as to cause volatilization of said solvent and cross-linking of said resin components whereby said cured further layer forms an inorganic layer substantially comprising metallic components and resinous binders; and providing said cured further layer with an organic top layer.

2. The process according to claim 1, wherein:

said organic top layer contains a lubricant.

3. The process according to claim 1, wherein the chromated layer contains a chrome yellow.

4. The process according to claim 1, wherein:

said chromated layer is applied as an extremely thin layer which is nevertheless resistant against wiping.

5. The process according to claim 1, wherein the chromatizing step is performed by using a chromate compound dissolved in an aqueous suspension.

6. The process according to claim 1, wherein the further layer contains zinc, about 85%, and aluminum, about 2 to 3%, or similar metals.

7. The process according to claim 1, wherein the further layer contains a solvent, about 10%, and a binding agent, about 5%.

8. The process according to claim 1, wherein the organic top layer contains an organic binding agent, a solvent, about 45 to 50%, and pigments.

9. The process according to claim 1, wherein the process is applied to means of construction comprising fasteners.

10. A process for coating a workpiece of steel with an anti-corrosive agent, comprising the steps of:

providing the surface of said workpiece with a chemo-mechaical layer which includes a galvanized component selected from the group of zinc, tin, aluminum, and cadmium;

chromatizing said chemo-mechanical layer;

providing said chromated layer with an adhering agent based upon water-soluble organic resins;

providing said chromated layer, with said adhering agent, with a further layer containing predominantly metallic components, resinous organic binding agents, and a solvent;

curing said further layer by means of a heat treatment comprising heating of said further layer upon said coated workpiece to a temperature level of approximately 200° C. for approximately 15–20 minutes so as to cause volatilization of said solvent and cross-linking of said resin components whereby said cured further layer forms an inorganic layer substantially comprising metallic components and resinous binders; and providing said cured further layer with an organic top layer.

11. The process as set forth in claim 1, wherein:

said chemo-mechanical layer contains a lubricant.

12. The process as set forth in claim 3, wherein:

said chemo-mechanical layer also contains a lubricant.

13. The process as set forth in claim 3, wherein:

said lubricant comprises PTFE particles.

14. The process as set forth in claim 11, wherein:

said lubricant comprises PTFE particles.

15. The process as set forth in claim 12, wherein:

said lubricant comprises PTFE particles.

16. The process as set forth in claim 1, wherein:

said organic top layer comprises an organic binding agent and a solvent.

17. The process as set forth in claim 13, wherein:

said chemo-mechanical layer contains a lubricant.

18. The process as set forth in claim 10, wherein:

said organic top layer contains a lubricant.

19. The process as set forth in claim 17, wherein:

said organic top layer contains a lubricant.

20. The process as set forth in claim 17, wherein:

said lubricant comprises PTFE particles.

21. The process as set forth in claim 18, wherein:

said lubricant comprises PTFE particles.

22. The process as set forth in claim 19, wherein:

said lubricant comprises PTFE particles.

23. A process for coating a workpiece of steel with an anti-corrosive agent, comprising the steps of:

providing the surface of said workpiece with a chemo-mechaical layer which includes a galvanized component selected from the group of zinc, tin, aluminum, and cadmimum;

chromatizing said chemo-mechanical layer;

providing said chromated layer with an adhering agent based upon water-soluble organic resins;

providing said chromated layer, with said adhering agent, with a further layer comprising predominantly metallic components, resinous organic binding agents, and a solvent; and curing said further layer by means of a heat treatment comprising heating of said further layer upon said coated workpiece to a temperature level of approximately 200° C. for approximately 15–20 minutes so as to cause volatilization of said solvent and cross-linking of said resin components whereby said cured further layer forms an inorganic layer substantially comprising metallic components and resinous binders.

24. The process as set forth in claim 22, wherein:

said further layer comprises approximately 85% zinc and approximately 2–3% aluminum.

25. The process as set forth in claim 22, wherein:

said further layer comprises approximately 10% solvent and approximately 5% binding agents.

26. The process as set forth in claim 22, wherein:

said chemo-mechanical layer comprises a lubricant.

27. The process as set forth in claim 25, wherein:

said lubricant comprises PTFE particles.

28. The process as set forth in claim 13, wherein:

said further layer comprises approximately 85% zinc and approximately 2–3% aluminum.

* * * * *